(12) United States Patent
Elsheimer et al.

(10) Patent No.: US 7,170,335 B2
(45) Date of Patent: Jan. 30, 2007

(54) DRIVER CIRCUIT FOR DRIVING A LIGHT SOURCE OF AN OPTICAL POINTING DEVICE

(75) Inventors: Robert Elsheimer, Fort Collins, CO (US); Robert M. Thelen, Fort Collins, CO (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 33 days.

(21) Appl. No.: 10/795,689

(22) Filed: Mar. 8, 2004

(65) Prior Publication Data

US 2005/0194915 A1 Sep. 8, 2005

(51) Int. Cl.
  G05F 1/10 (2006.01)
  G01R 19/00 (2006.01)
(52) U.S. Cl. .......................... 327/538; 327/37
(58) Field of Classification Search .............. 315/291, 315/307, 224; 372/38.07, 29.015, 38.02 372/31, 37; 250/205; 327/175, 538
  See application file for complete search history.

(56) References Cited

U.S. PATENT DOCUMENTS

| | | | | |
|---|---|---|---|---|
| 4,967,417 A | * | 10/1990 | Yamada | 372/29.015 |
| 5,134,323 A | * | 7/1992 | Congdon | 327/430 |
| 5,305,337 A | * | 4/1994 | Araki et al. | 372/31 |
| 5,802,089 A | * | 9/1998 | Link | 372/38.02 |
| 5,936,986 A | * | 8/1999 | Cantatore et al. | 372/38.02 |
| 5,966,395 A | * | 10/1999 | Ikeda | 372/38.01 |
| 6,265,832 B1 | | 7/2001 | Maisel et al. | 315/164 |
| 6,320,890 B1 | * | 11/2001 | Taguchi | 372/380.02 |
| 6,392,215 B1 | * | 5/2002 | Baumgartner et al. | 250/205 |
| 6,408,087 B1 | * | 6/2002 | Kramer | 382/124 |
| 6,496,526 B1 | * | 12/2002 | McIntyre | 372/38.02 |
| 6,555,966 B2 | * | 4/2003 | Pitigoi-Aron | 315/158 |
| 6,631,218 B2 | | 10/2003 | Badyal et al. | 382/307 |
| 6,674,269 B1 | | 1/2004 | McIntyre | 323/266 |
| 6,683,490 B2 | * | 1/2004 | Kaminishi | 327/538 |
| 6,744,795 B2 | * | 6/2004 | Magoon | 372/38.02 |
| 6,762,636 B1 | * | 7/2004 | Khawshe | 327/175 |
| 6,826,215 B2 | * | 11/2004 | Tsuji et al. | 372/38.02 |
| 6,956,408 B2 | * | 10/2005 | Schrodinger et al. | 327/66 |
| 2001/0043093 A1 | | 11/2001 | Sakura et al. | 327/108 |
| 2003/0039280 A1 | * | 2/2003 | Mangano et al. | 372/38.02 |
| 2003/0156609 A1 | * | 8/2003 | Tsai | 372/38.02 |
| 2003/0235062 A1 | | 12/2003 | Burgyan et al. | 363/121 |
| 2004/0114649 A1 | * | 6/2004 | Asuri et al. | 372/38.02 |
| 2004/0178778 A1 | * | 9/2004 | Bansal | 323/274 |
| 2004/0264526 A1 | * | 12/2004 | Schrodinger | 372/38.1 |
| 2005/0093488 A1 | * | 5/2005 | Hung et al. | 315/307 |

* cited by examiner

Primary Examiner—Wilson Lee
Assistant Examiner—Angela M Lie

(57) ABSTRACT

A driver circuit for driving a light source of an optical pointing device includes a first transistor coupled to the light source. The driver circuit includes a controller coupled to the first transistor for monitoring a first current through the light source, comparing the first current to a reference current, and generating a control signal based on a result of the comparison, wherein the control signal causes the first transistor to change the first current.

14 Claims, 4 Drawing Sheets

DRIVER CIRCUIT FOR DRIVING A LIGHT SOURCE OF AN OPTICAL POINTING DEVICE

THE FIELD OF THE INVENTION

This invention relates generally to devices for controlling a pointer on a display screen, and relates more particularly to a driver circuit for driving a light source of an optical pointing device.

BACKGROUND OF THE INVENTION

The use of a hand operated pointing device for use with a computer and its display has become almost universal. One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mechanical mouse, optical pointing devices have also been developed. In one form of an optical pointing device, rather than using a moving mechanical element like a ball, relative movement between an imaging surface, such as a finger or a desktop, and photo detectors within the optical pointing device, is optically sensed and converted into movement information.

Optical pointing devices typically include a light source for illuminating a surface to be imaged. For an optical mouse, the light source, such as a light emitting diode (LED), illuminates the surface under the mouse. While the mouse is moved, the LED is typically turned on at a constant frequency based on the frame rate of the optical motion sensor.

It is desirable to tightly control the range of illumination of the light source of optical pointing devices over the manufacturing process, operating modes, and operating conditions. For example, if several thousand optical pointing devices of a particular model are manufactured, it is preferable that all of the devices provide a similar level of illumination. It is also desirable that the light output be tightly controlled during operating modes, such as during different power saving modes, and in transitioning between the various operating modes. Existing optical pointing devices do not provide such control over the level of illumination.

SUMMARY OF THE INVENTION

One form of the present invention provides a driver circuit for driving a light source of an optical pointing device. The driver circuit includes a first transistor coupled to the light source. The driver circuit includes a controller coupled to the first transistor for monitoring a first current through the light source, comparing the first current to a reference current, and generating a control signal based on a result of the comparison, wherein the control signal causes the first transistor to change the first current.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
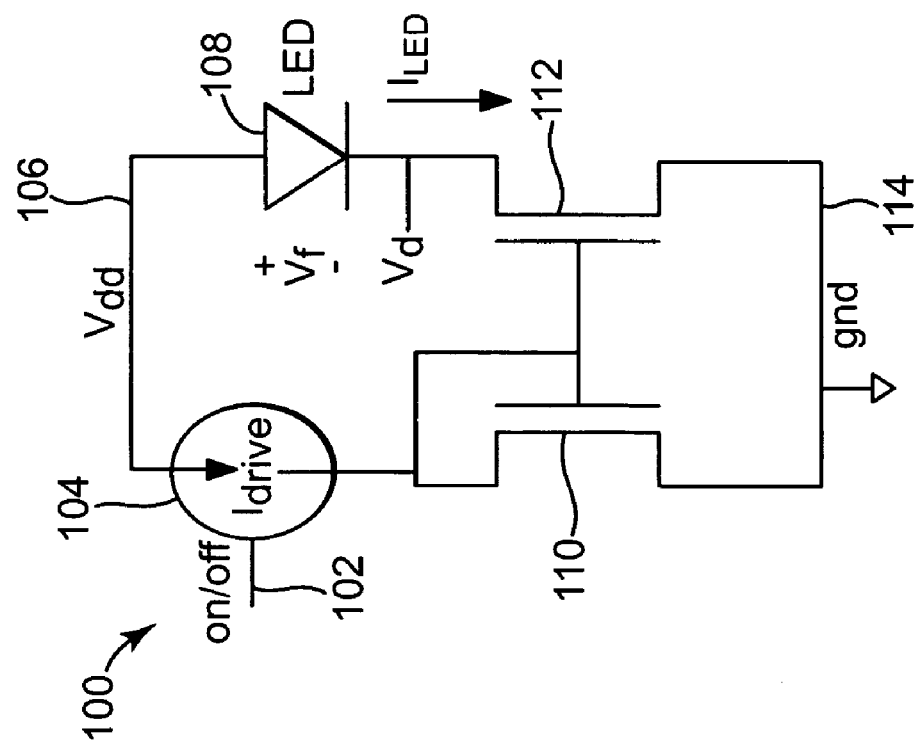
FIG. 1 is a schematic diagram illustrating a prior art light source circuit for an optical pointing device.

FIG. 1 is a schematic diagram illustrating a prior art light source circuit 100 for an optical pointing device. Light source circuit 100 includes current source 104, light emitting diode (LED) 108, and transistors 110 and 112. In the illustrated embodiment, transistors 110 and 112 are metal-oxide-semiconductor field-effect transistors (MOSFET's). Bipolar junction transistors (BJT's) may also be used in some prior art light source circuits. Current source 104 is connected to a control line 102 for receiving an on/off control signal. Current source 104 is connected between a power supply 106 ($V_{dd}$) and the drain of transistor 110. The drain of transistor 110 is connected to the gate of transistor 110 and the gate of transistor 112. The sources of transistors 110 and 112 are connected to ground 114. Transistors 110 and 112 are connected in a current mirror configuration. LED 108 is connected between the power supply 106 ($V_{dd}$) and the drain of transistor 112.

In operation, circuit 100 is powered on and off by a controller (not shown) via control line 102. When circuit 100 is powered on, current source 102 provides a drive current ($I_{drive}$), which causes transistors 110 and 112 to turn on and begin conducting current. The current ($I_{LED}$) through LED 108 causes the LED 108 to emit light. When circuit 100 is powered down via control line 102, current source 102 stops providing the drive current ($I_{drive}$), transistors 110 and 112 turn off, and the LED 108 stops emitting light.

As mentioned above in the Background of the Invention section, it is desirable to tightly control the range of illumination of the light source of optical pointing devices. Keeping the light output tightly controlled requires tightly controlling the current through the light source (e.g., tightly controlling $I_{LED}$). Tight control of the LED current over the manufacturing process, operating modes, and operating conditions, is difficult, because the LED forward voltage ($V_f$) can vary in some products from between 50% and 98.5% of the power supply voltage ($V_{dd}$) over various conditions. The LED forward voltage ($V_f$) for the circuit 100 shown in FIG. 1 is equal to the power supply voltage ($V_{dd}$) minus the voltage ($V_d$) at the drain of transistor 112. Thus, the voltage ($V_d$) at the drain of transistor 112 is equal to the power supply voltage ($V_{dd}$) minus the LED forward voltage ($V_f$). The transistor 112, whether it is a MOS or bipolar device, operates in different regions depending upon the voltage ($V_d$) at the drain of transistor 112.

An LED 108 with high forward voltage ($V_f$) for a given LED current ($I_{LED}$) will cause the voltage ($V_d$) at the drain of transistor 112 to be less than about 0.1 volts. When the voltage ($V_d$) at the drain of transistor 112 is less than 0.1 volts, the transistor 112 is pushed into an operating region where the drain to source current of the transistor 112 depends upon the drain to source voltage ($V_d$) of the transistor 112. As the voltage ($V_d$) at the drain of transistor 112 decreases, the drain to source current of transistor 112 decreases. Since the LED current ($I_{LED}$) is the same as the drain to source current of transistor 112, the LED current ($I_{LED}$) decreases as the voltage ($V_d$) at the drain of transistor 112 decreases below about 0.1 volts.

The circuit 100 shown in FIG. 1 provides a fixed drive current ($I_{drive}$) and does not make any adjustment of the LED 108 current ($I_{LED}$) to account for LED 108 forward voltage ($V_f$) variation, or supply voltage ($V_{dd}$) variation. Another prior solution is to use a resistor in series with the LED 108 to provide some control of the LED 108 current ($I_{LED}$), as described below with reference to FIG. 2.

Figure 2:
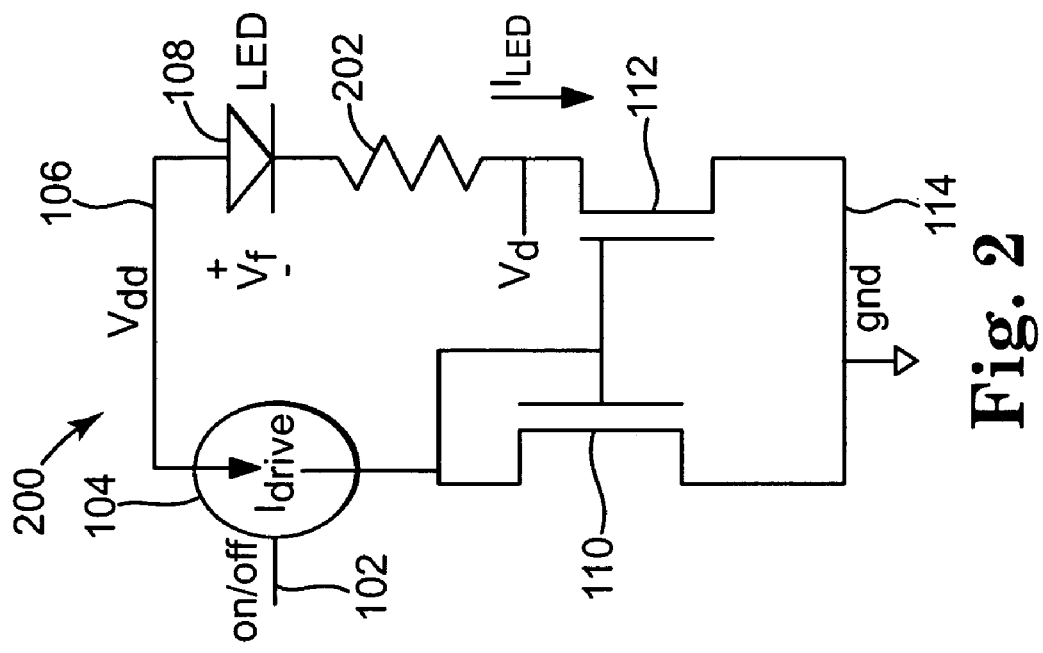
FIG. 2 is a schematic diagram illustrating a prior art light source circuit for an optical pointing device, which includes a series resistor for tuning the LED current during production.

FIG. 2 is a schematic diagram illustrating a prior art light source circuit 200 for an optical pointing device, which includes a series resistor 202 for tuning the LED current during production. Light source circuit 200 is the same as light source circuit 100 (FIG. 1) with the exception that resistor 202 has been added in series between the LED 108 and the transistor 112. The value for resistor 202 is chosen during production to provide a desired level of LED current ($I_{LED}$). A problem with this approach is that the resistor 202 is not typically integrated with the rest of the circuit 200. Resistor 202 could be integrated using a laser trim process, but such a process is expensive. In addition, regardless of whether the resistor 202 is integrated or not, for lower power supply voltages ($V_{dd}$) there may not be enough "headroom" to use a resistor 202. For example, for a supply voltage ($V_{dd}$) of 2.5 volts, and an LED forward voltage ($V_f$) of 2.4 volts at the desired current, only 0.1 volts remain for the transistor 112. If a resistor 202 is added, the voltage drops even further. Also, the addition of a series resistor 202 provides a one time tuning function during production, but does not compensate for changes in operating conditions, such as changes in supply voltage ($V_{dd}$) or temperature, which occur after the product has been built.

Another option is to use fuses during production to change the size of the transistor 112, and correspondingly provide a desired level of LED current ($I_{LED}$). However, this is also a one time tuning function that is performed during production, and does not compensate for changes in operating conditions after the product has been built and is in use by a customer.

Figure 3:
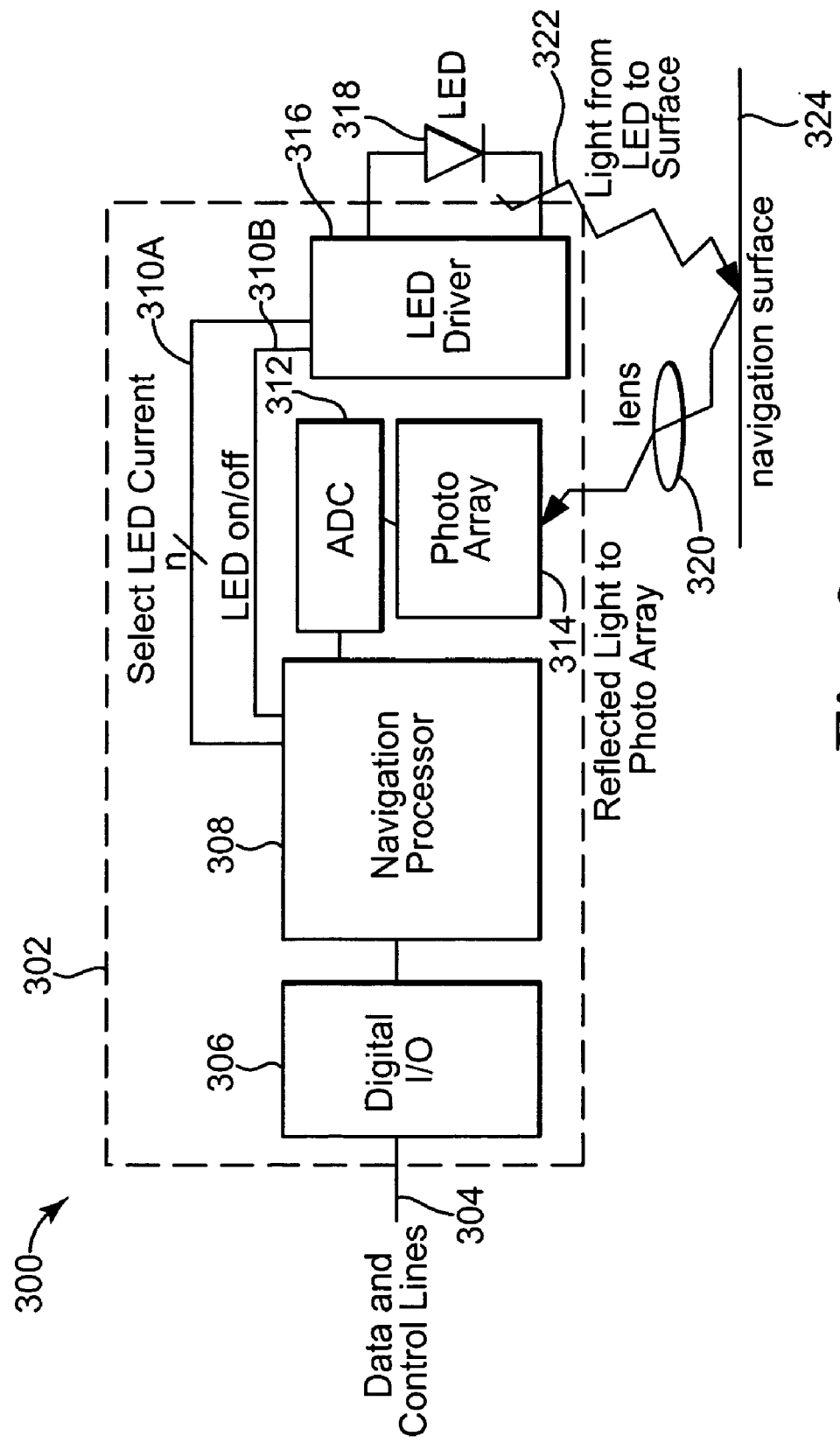
FIG. 3 is a block diagram illustrating major components of an optical pointing device according to one embodiment of the present invention.

FIG. 3 is a block diagram illustrating major components of an optical pointing device 300 according to one embodiment of the present invention. Optical pointing device 300 includes optical navigation integrated circuit (IC) 302, light source 318, and lens 320. Optical navigation integrated circuit 302 includes digital input/output circuitry 306, navigation processor 308, analog to digital converter (ADC) 312, photo detector array (photo array) 314, and LED driver circuit 316.

In operation, according to one embodiment, light source 318 emits light 322 onto navigation surface 324, which is a desktop or other suitable surface, and reflected images are generated. In one embodiment, light source 318 includes one or more LED's, and is also referred to as LED 318. Light source 318 is controlled by LED driver circuit 316, which is controlled by navigation processor 308 via control lines 310A and 310B. In one embodiment, control line 310A is an n-bit control line that is used by navigation processor 308 to select a desired level of current (from $2^n$ possible current levels) through the LED 318. In one embodiment, n=8, so navigation processor 308 can select from 256 different current levels using control line 310A. Control line 310B is used by navigation processor 308 to cause LED driver circuit 316 to be powered on and off, and correspondingly cause LED 318 to be powered on and off.

Reflected light from surface 324 is directed by lens 320 onto photo detector array 314. Each photo detector in photo detector array 314 provides a signal that varies in magnitude based upon the intensity of light incident on the photo detector. The signals from photo detector array 314 are output to analog to digital converter 312, which converts the signals into digital values of a suitable resolution (e.g., eight bits). The digital values represent a digital image or digital representation of the portion of the desktop or other navigation surface under optical pointing device 300. The digital values are stored as frames within navigation processor 308.

The overall size of photo detector array 314 is preferably large enough to receive an image having several features. Images of such spatial features produce translated patterns of pixel information as optical pointing device 300 moves over a surface. The number of photo detectors in array 314 and the frame rate at which their contents are captured and digitized cooperate to influence how fast optical pointing device 300 can be moved across a surface and still be tracked. Tracking is accomplished by navigation processor 308 by comparing a newly captured sample frame with a previously captured reference frame to ascertain the direction and amount of movement.

In one embodiment, the entire content of one of the frames is shifted by navigation processor 308 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by navigation processor 308 on a pixel by pixel basis, and the resulting differences are preferably squared and then summed to form a measure of similarity (correlation) within that region of overlap. In another embodiment, larger trial shifts (e.g., two over and one down) may be used. The trial shift with the least difference (greatest correlation) can be taken as an indication of the motion between the two frames. That is, it provides raw movement information that may be scaled and or accumulated to provide movement information ($\Delta X$ and $\Delta Y$) of a convenient granularity and at a suitable rate of information exchange, which is output to a host device by digital input/output circuitry 306 on data and control lines 304. Optical pointing device 300 is also configured to receive data and control signals from a host device via data and control lines 304.

In one embodiment, optical pointing device 300 captures images at a particular frequency (e.g., 1500 frames per second), and navigation processor 308 uses control line 310B to cause LED 318 to be pulsed on and off at the same frequency (e.g., 1500 pulses per second).

Figure 4:
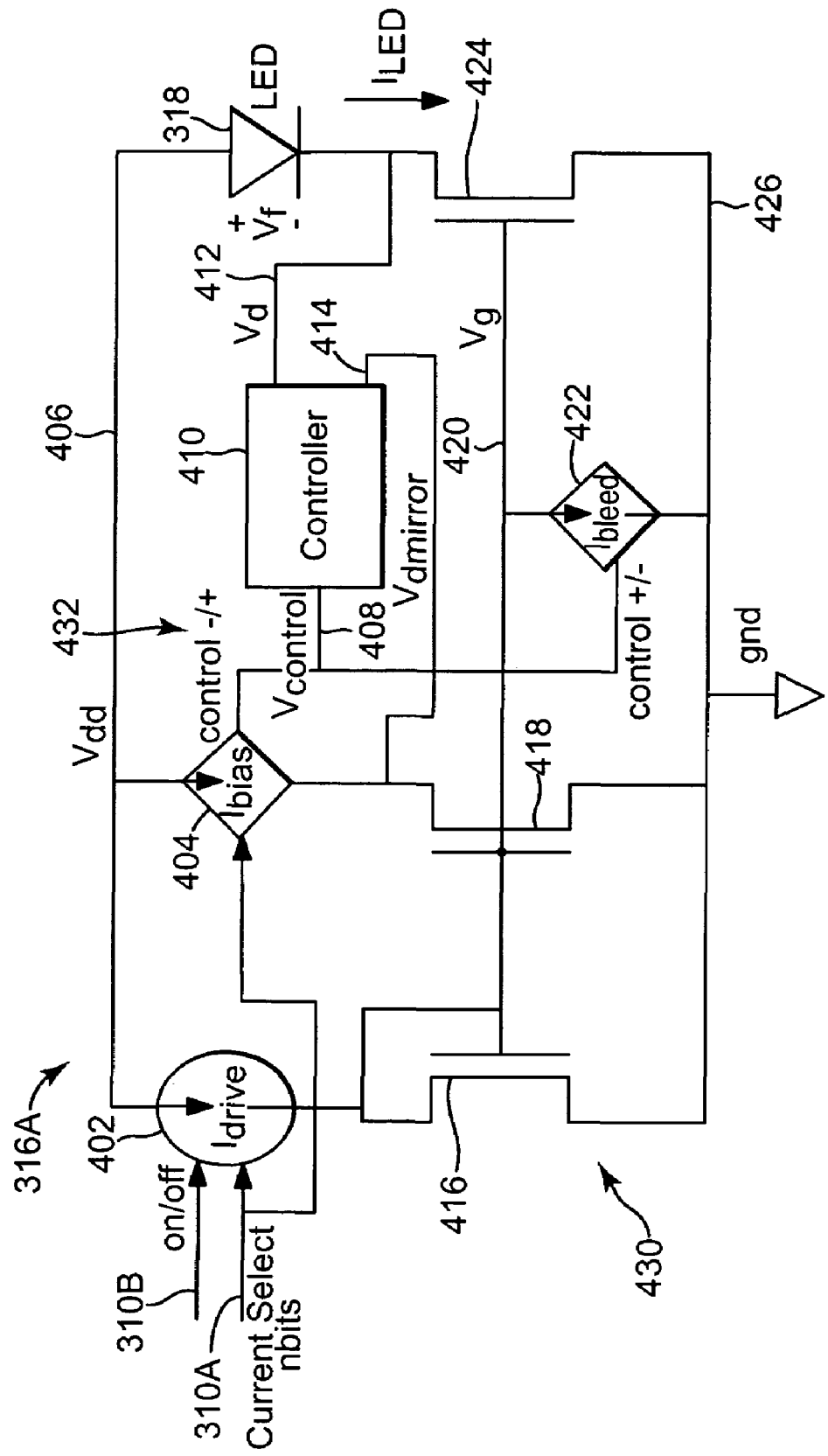
FIG. 4 is a schematic diagram illustrating the LED driver circuit shown in block form in FIG. 3 according to one embodiment of the present invention.
Figure 5:
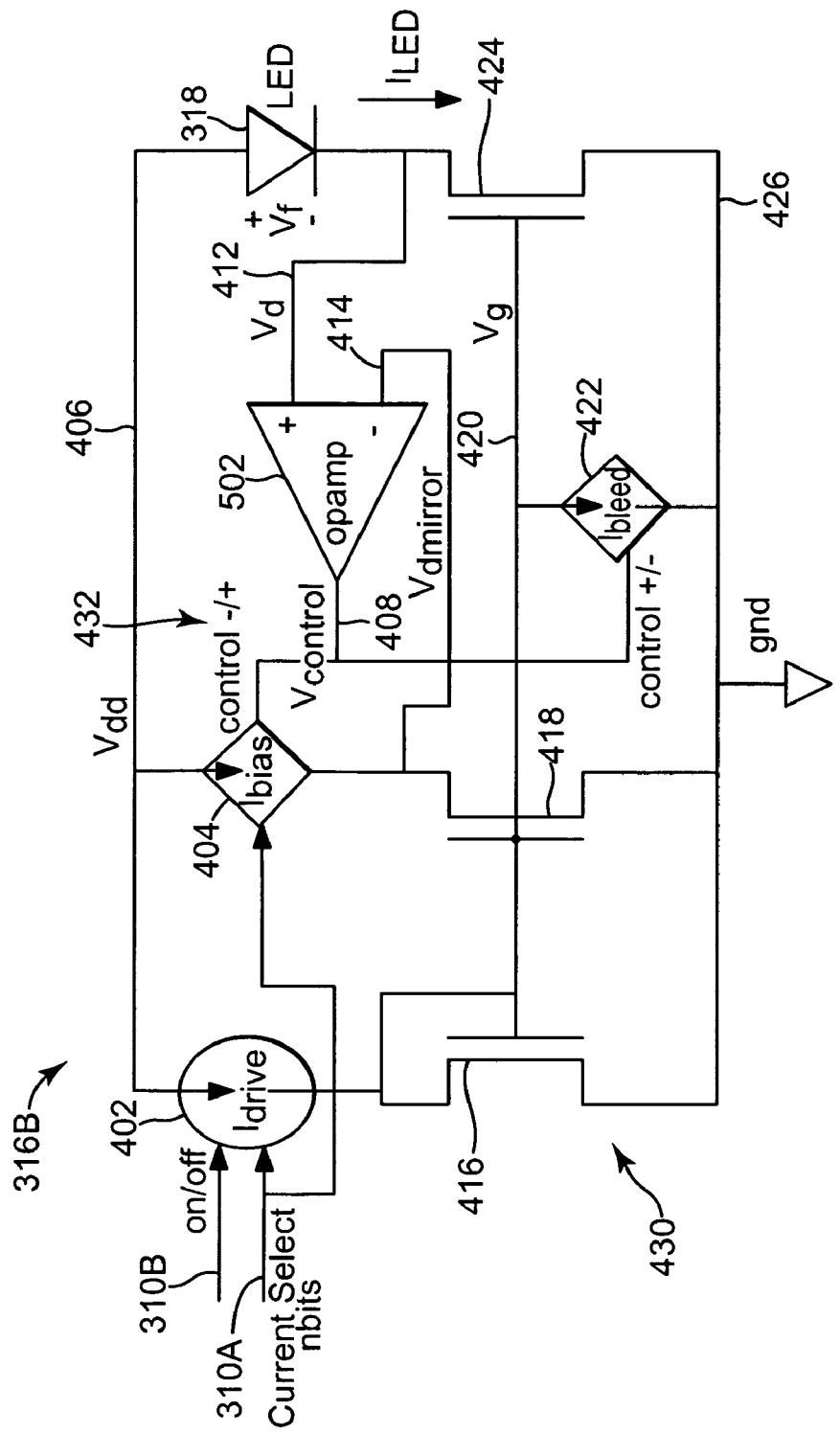
FIG. 5 is a schematic diagram illustrating the LED driver circuit shown in block form in FIG. 3 according to another embodiment of the present invention.

FIG. 4 is a schematic diagram illustrating the LED driver circuit 316 shown in block form in FIG. 3 according to one embodiment of the present invention. The embodiment of LED driver circuit 316 shown in FIG. 4 is identified by reference number "316A." Another embodiment of LED driver circuit 316 is shown in FIG. 5, is identified by reference number "316B," and is described below with reference to FIG. 5.

As shown in FIG. 4, LED driver circuit 316A includes drive circuit 430 and current monitor and control circuit 432. Drive circuit 430 includes current source 402, and transistors 416 and 424. Current monitor and control circuit 432 includes current source 404, transistor 418, controller 410, and current source 422. In one embodiment, transistors 418 and 424 are matched transistors. In the illustrated embodiment, transistors 416, 418, and 424 are MOSFET's. In another embodiment, circuit 316A uses bipolar junction transistors.

Current source 402 is connected to control line 310B for receiving an on/off control signal from navigation processor 308 (FIG. 3), and is connected to control line 310A for receiving a current selection signal from the navigation processor 308. Current source 402 is connected between a power supply 406 ($V_{dd}$) and the drain of transistor 416. The drain of transistor 416 is connected to the gate of transistor 416, the gate of transistor 418, and the gate of transistor 424. The sources of transistors 416, 418, and 424 are connected to ground 426. Transistors 416, 418, and 424 are connected in a current mirror configuration.

Current source 404 is connected to control line 310A for receiving a current selection signal from the navigation processor 308. Current source 404 is connected between power supply 406 ($V_{dd}$) and the drain of transistor 418. Controller 410 includes a first input connected to the drain of transistor 424 via line 412, and a second input connected to the drain of transistor 418 via line 414. Controller 410 includes an output connected to the current sources 404 and 422 via line 408. Current source 422 is connected between ground 426 and the line 420 connecting the gates of transistors 416, 418, and 424. LED 318 is connected between the power supply 406 ($V_{dd}$) and the drain of transistor 424.

In operation, according to one form of the invention, circuit 316A is powered on and off by a navigation processor 308 via control line 310B. When circuit 316A is powered on, current source 402 provides a drive current ($I_{drive}$), which causes transistors 416, 418, and 424 to turn on and begin conducting current. Current source 404 provides a bias current ($I_{bias}$). Current source 422 provides a bleed current ($I_{bleed}$). In one embodiment, the magnitude of the current provided by current sources 402 and 404 is set by the navigation processor 308 via control line 310A based on the desired level of current ($I_{LED}$) through the LED 318. In one form of the invention, the navigation processor 308 sets the bias current ($I_{bias}$) provided by current source 404 via control line 310A to a first order, and the bias current ($I_{bias}$) provided by current source 404 is then adjusted to a second order by controller 410 as described in further detail below. The current ($I_{LED}$) through LED 318 causes the LED 318 to emit light. When circuit 316A is powered down via control line 310B, current source 402 stops providing the drive current ($I_{drive}$), transistors 416, 418, and 424 turn off, and the LED 318 stops emitting light.

In one embodiment, drive circuit 430 and current monitor and control circuit 432 work in conjunction to drive the LED 318 with a current ($I_{LED}$) that is relatively constant regardless of the voltage ($V_d$) at the drain of the transistor 424. The LED forward voltage ($V_f$) for the circuit 316A shown in FIG. 3 is equal to the power supply voltage ($V_{dd}$) minus the voltage ($V_d$) at the drain of transistor 424. Thus, the voltage ($V_d$) at the drain of transistor 424 is equal to the power supply voltage ($V_{dd}$) minus the LED forward voltage ($V_f$).

In one embodiment, controller 410 monitors the gate (or base for a BJT) and the drain (or collector for a BJT) of transistor 424, and uses that information to determine the current ($I_{LED}$) through the LED 318. Controller 410 then compares the current ($I_{LED}$) through the LED 318 to a reference current, which is the current ($I_{bias}$) provided by current source 404 in the embodiment illustrated in FIG. 4. In one embodiment, controller 410 compares the two currents ($I_{LED}$ and $I_{bias}$) by comparing the drain voltages ($V_{dmirror}$ and $V_d$) of transistors 418 and 424. Since transistors 418 and 424 have the gate node in common, when the drain voltages ($V_{dmirror}$ and $V_d$) of the two transistors 418 and 424 are equal, the current ($I_{LED}$) through the LED 318 will be proportional to the current ($I_{bias}$) provided by current source 404. A deviation in the voltage ($V_d$) at the drain of transistor 424 from the voltage ($V_{dmirror}$) at the drain of transistor 418 is an indication that the current ($I_{LED}$) through the LED 318 has deviated from being proportional to the current ($I_{bias}$) provided by current source 404. Differences in the currents ($I_{LED}$ and $I_{bias}$) may result from changes in the supply voltage ($V_{dd}$), temperature, or from choosing LED's with a range of forward voltages ($V_f$). Note that the gate voltage ($V_g$) of transistor 424 is indirectly sensed by controller 410 since the value of the gate voltage ($V_g$) of transistor 424 contributes to the drain voltages ($V_{dmirror}$ and $V_d$) of transistors 418 and 424, which are directly sensed by controller 410 in the illustrated embodiment.

Feedback is used to adjust the gate (or base for a BJT) drive voltage ($V_g$) of transistor 424 to increase or decrease the current ($I_{LED}$) through the LED 318 until it matches the reference current ($I_{bias}$) provided by current source 404. In one embodiment, the feedback control loop, which includes lines 408, 412, and 414, and controller 410, maintains the current ($I_{LED}$) through the LED 318 as proportional to the reference current ($I_{bias}$) provided by current source 404 over all operating conditions. In one form of the invention, navigation processor 308 (FIG. 3) digitally programs the reference current ($I_{bias}$) provided by current source 404 via control line 310A, which provides further control over the current ($I_{LED}$) through the LED 318.

In one form of the invention, current monitor and control circuit 432 adjusts the voltage ($V_g$) at the gate of transistor 424 to compensate for lower drain to source current of transistor 424 at lower drain voltages ($V_d$) of transistor 424. In one embodiment, controller 410 senses the voltage ($V_d$) at the drain of transistor 424 and the voltage ($V_{dmirror}$) at the drain of transistor 418, compares the two voltages ($V_d$ and $V_{dmirror}$) and attempts to equalize the two voltages ($V_d$ and $V_{dmirror}$). In one embodiment, controller 410 attempts to equalize the two voltages ($V_d$ and $V_{dmirror}$) by adjusting the voltage ($V_g$) at the gate of transistor 424 using a voltage control signal ($V_{control}$). Controller 410 outputs the voltage control signal ($V_{control}$) to current sources 404 and 422 via line 408. Controller 410 causes current sources 404 and 422 to increase or decrease the amount of current being output using the voltage control signal ($V_{control}$).

For an LED 318 with a high forward voltage ($V_f$), and/or if the voltage supply ($V_{dd}$) is low, the voltage ($V_d$) at the drain of transistor 424 may be below 0.1 volts, which pushes the transistor 424 into a region where the drain to source current (which is the same as the current ($I_{LED}$) through the LED 318) depends upon the drain to source voltage ($V_d$) of transistor 424. In that case, in one embodiment, the controller 410 adjusts the voltage control signal ($V_{control}$) output on line 408 such that the current ($I_{bleed}$) provided by current source 422 is decreased, which increases the voltage ($V_g$) at the gate of transistor 424. The increased voltage ($V_g$) at the gate of transistor 424 acts to increase the drain to source current of transistor 424, thereby compensating for the decrease in the drain to source current of transistor 424 that resulted from a drain voltage ($V_d$) of transistor 424 of less than 0.1 volts.

Similarly, if the forward voltage ($V_f$) of the LED 318 is low so that the voltage ($V_d$) at the drain of transistor 424 is greater than 0.1 volts, then, in one embodiment, the controller 410 again acts to equalize the voltage ($V_d$) at the drain of transistor 424 and the voltage ($V_{dmirror}$) at the drain of transistor 418. In this case, the controller 410 adjusts the voltage control signal ($V_{contol}$) output on line 408 to increase the current ($I_{bleed}$) provided by current source 422, which decreases the voltage ($V_g$) at the gate of transistor 424. The resulting decrease in the drain to source current of transistor 424 offsets the increase in the drain to source current of transistor 424 resulting from the increase in the drain voltage ($V_d$) of transistor 424.

The voltage control signal ($V_{control}$) output by controller 410 on line 408 is also provided to current source 404 to appropriately adjust the bias current ($I_{bias}$) provided by current source 404 in each of the above two cases (e.g., the case where the voltage ($V_d$) at the drain of transistor 424 is greater than 0.1 volts, or the case where the voltage ($V_d$) at the drain of transistor 424 is less than 0.1 volts) so that the voltage ($V_{dmirror}$) at the drain of transistor 418 can be effectively equalized to the voltage ($V_d$) at the drain of transistor 424. Thus, in one form of the invention, the bias current ($I_{bias}$) provided by current source 404 and the bleed current ($I_{bleed}$) provided by current source 422 are both controlled by the voltage control signal ($V_{control}$) output by the controller 410 on line 408. In one embodiment, the gain for controlling the bias current ($I_{bias}$) provided by current source 404 is weaker than the gain for controlling the bleed current ($I_{bleed}$) provided by current source 422, so that changes in the voltage ($V_d$) at the drain of transistor 424 will cause small changes in the bias current ($I_{bias}$) and larger changes in the bleed current ($I_{bleed}$).

In another form of the invention, the voltage control signal ($V_{control}$) output by controller 410 on line 408 is only used to control the bleed current ($I_{bleed}$) provided by current source 422, and not the bias current ($I_{bias}$) provided by current source 404, so that the bias current ($I_{bias}$) remains fixed. A purpose of the adjustment of the bias current ($I_{bias}$) provided by current source 404 is to get the voltage ($V_{dmirror}$) at the drain of transistor 418 in the range near the voltage ($V_d$) at the drain of transistor 424. With a fixed bias current ($I_{bias}$), the voltage ($V_{dmirror}$) at the drain of transistor 418 and the voltage ($V_d$) at the drain of transistor 424 could end up being very far apart due to wafer processing variations, such as transistor mismatch. The adjustment of the bias current ($I_{bias}$) by the voltage control signal ($V_{control}$) output by controller 410 helps to bring the voltage ($V_{dmirror}$) at the drain of transistor 418 closer to an optimum starting point. Thus, even if bias voltages are not optimum for a given wafer, the controller 410 places the voltage ($V_{dmirror}$) at the drain of transistor 418 at a good starting point. Then the bleed current ($I_{bleed}$) provided by current source 422 is adjusted by controller 410 to make the voltage ($V_d$) at the drain of transistor 424 equal to the voltage ($V_{dmirror}$) at the drain of transistor 418. So, in one embodiment, the controller 410 makes small adjustments (i.e., low gain adjustments) to the bias current ($I_{bias}$) provided by current source 404 to bring the voltages ($V_d$ and $V_{dmirror}$) in range, and the controller 410 makes larger adjustments (i.e., higher gain adjustments) to the bleed current ($I_{bleed}$) provided by current source 422 to make the voltages ($V_d$ and $V_{dmirror}$) equal to each other.

In one form of the invention, controller 410 is a digital controller. In another form of the invention controller 410 is an analog controller. In one embodiment, the analog controller is an operational amplifier. FIG. 5 is a schematic diagram illustrating the LED driver circuit 316 shown in block form in FIG. 3 according to another embodiment of the present invention, wherein the controller 410 is implemented with an operational amplifier (opamp) 502. The LED driver circuit 316B shown in FIG. 5 is configured in the same manner as the circuit 316A shown in FIG. 4 and functions in the same manner as described above with reference to FIG. 4, but the controller 410 is shown in FIG. 5 as an operational amplifier 502.

In one embodiment, optical pointing device 300 (FIG. 3) is an optical mouse for a desktop personal computer, workstation, portable computer, or other device. In another embodiment, optical pointing device 300 is configured as an optical fingerprint sensing pointing device, or other pointing device.

It will be understood by a person of ordinary skill in the art that functions performed by optical pointing device 300 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Embodiments of the present invention provide several advantages over prior art LED driver circuits. One embodiment of LED driver circuit 316 provides tight control over the range of illumination of the LED 318 over various operating modes and operating conditions, and during transitions between various operating modes, such as sleep modes. One embodiment of LED driver circuit 316 is completely integrated in an integrated circuit, and no external components, such as a series resistor used in some prior art driver circuits, need to be added by the customer after production. LED driver circuit 316 according to one form of the invention also provides continual tuning or adjustment of the LED current after production and during normal operation, which provides an advantage over prior art LED driver circuits that may use a series resistor or fuses to provide a one time tuning function during production.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A driver circuit for driving a light source of an optical pointing device, the driver circuit comprising:
    a first transistor coupled to the light source at a first node;
    a first current source for providing a reference current;
    a second transistor coupled to the first current source and to the first transistor; and
    a controller coupled to the first transistor and the light source at the first node for monitoring a first current through the light source, comparing the first current to a reference current, and generating a control signal based on a result of the comparison, wherein the control signal causes the first transistor to change the first current; and
    wherein the reference current is adjusted based on the result of the comparison.

2. The driver circuit of claim 1, wherein the driver circuit is implemented in an integrated circuit.

3. The driver circuit of claim 1, wherein the controller is a digital controller.

4. The driver circuit of claim 1, wherein the controller is an analog controller.

5. The driver circuit of claim 1, wherein the controller comprises an operational amplifier.

6. The driver circuit of claim 1, wherein the first current source is configured to receive the control signal and adjust the reference current based on the received control signal.

7. The driver circuit of claim 6, wherein the first current source is configured to receive a current selection signal from a processor of the optical pointing device and adjust the reference current based on the current selection signal.

8. The driver circuit of claim 1, and further comprising:
    a second current source coupled to the first transistor end to the controller far receiving the control signal and changing a drive signal to the first transistor based on the received control signal, thereby causing the first transistor to change the first current.

9. The driver circuit of claim 8, and further comprising:
    a third current source for providing a drive current;
    a third transistor coupled to the third current source; and
    wherein the first transistor, second transistor, and third transistor are coupled together in a current mirror configuration.

10. A method of driving a light source of an optical pointing device, the method comprising:
    providing a reference current;
    providing at least two controlled current sources directly coupled to a controller that are responsive to control signals from the controller;
    comparing a light source current through the light source with the reference current; and
    continually adjusting the light source current through the light source with the controlled current sources during normal operation of the optical pointing device to match the reference current; and
    adjusting the reference current based on a result of the comparison.

11. The method of claim 10, wherein the comparison is performed by the controller.

12. The method of claim 11, wherein the controller is an operational amplifier.

13. The method of claim 10, wherein the step of adjusting the light source current comprises:
    providing a drive transistor coupled to the light source;
    providing a drive signal to the drive transistor for controlling the light source current through the light source; and
    generating a control signal based on a result of the comparison that adjusts the drive signal, thereby modifying the light source current through the light source to match the reference current.

14. A method of driving a light source of an optical pointing device, the method comprising:
    providing a reference current;
    comparing a light source current through the light source with the reference current;
    continually adjusting the light source current through the light source during normal operation of the optical pointing device to match the reference current; and
    adjusting the reference current based on a result of the comparison.

* * * * *

UNITED STATES PATENT AND TRADEMARK OFFICE
CERTIFICATE OF CORRECTION

PATENT NO.       : 7,170,335 B2
APPLICATION NO.  : 10/795689
DATED            : January 30, 2007
INVENTOR(S)      : Robert Elsheimer It is certified that error appears in the above-identified patent and that said Letters Patent is hereby corrected as shown below:

Col. 9, line 33; In Claim 8, delete "end" and insert -- and --.
Col. 9, line 34; In Claim 8, delete "far" and insert -- for --.

Signed and Sealed this

Thirteenth Day of May, 2008

JON W. DUDAS
*Director of the United States Patent and Trademark Office*